UNITED STATES PATENT OFFICE.

JAMES HEBBARD, OF BROKEN HILL, NEW SOUTH WALES, AUSTRALIA, ASSIGNOR, BY MESNE ASSIGNMENTS, TO MINERALS SEPARATION NORTH AMERICAN CORPORATION.

SEPARATION OF MIXED SULFID ORES.

1,261,810.      Specification of Letters Patent.      Patented Apr. 9, 1918.

No Drawing.      Application filed April 12, 1915. Serial No. 20,815.

*To all whom it may concern:*

Be it known that I, JAMES HEBBARD, by occupation manager, subject of the King of Great Britain, residing at Sulphide Corporation Limited Central Mine, Broken Hill, in the State of New South Wales, Commonwealth of Australia, have invented new and useful Improvements in the Separation of Mixed Sulfid Ores, of which the following is a specification.

This invention relates to certain improvements in or relating to the separation of mixed sulfid ores and refers to the separation of such ores by flotation and more especially to the fractional or differential flotation of certain sulfids from other sulfids. In the following claims the term "ore" is intended to include concentrates, tailings, slimes and other products containing metalliferous minerals.

This present invention relates more especially to certain improvements in the agitation-froth process of concentrating ores of the general type described in the prior Patents No. 835,120 of November 6, 1906, No. 962,678 of June 28, 1910, and No. 1,064,723 of June 17, 1913, in which the ores are subjected to agitation and (or) aeration in a liquid in the presence of a frothing agent, whereby a froth of the metallic particles is produced. It is to be understood, however, that the invention is also applicable to other known methods of flotation separation. This invention has for its object the treatment of mixed sulfid ores for obtaining a differential separation of the metallic sulfids.

It has been proposed to increase the froth stability when concentrating an ore containing an insufficiency of metalliferous particles by the agitation-froth process, by the addition of a small amount of finely divided carbon, whereby a low grade pulp can be made to produce a coherent froth which will carry with it the bulk of the metalliferous particles.

I have now discovered that if a finely pulverized ore is subjected to flotation separation with agitation and (or) aeration with a frothing agent (such as eucalyptus oil) in the presence of powdered charcoal or coke or graphite or such like carbonaceous substance a preferential flotation separation of certain sulfids from other sulfids can be obtained.

In adapting this invention to the separation of mixed zinc and lead sulfids the ore in a finely pulverized condition is subjected to flotation separation with agitation and (or) aeration in the presence of an amount of powdered charcoal, coke, graphite or other like carbonaceous material equivalent to from 1 to 2 pounds per ton of ore treated. The separation may be carried out with a small quantity of a frothing agent or the circuit liquor may be that which has previously been emulsified, *i. e.* has previously been used for flotation separation with a frothing agent. The circuit water should be neutral or alkaline but not acid. A differential float concentrate relatively rich in lead sulfids is then obtained. The residues may be subjected to retreatment by the ordinary flotation processes preferably with acid to obtain float concentrates relatively rich in zinc sulfids. In practice the separating boxes may be arranged in sequence, the first series being adapted for obtaining float concentrates relatively rich in lead and the second series float concentrates relatively rich in zinc.

The following is an example of the application of this invention to the zinc section feed of the mill of the Sulphide Corporation of Broken Hill in New South Wales assaying silver 8.2 oz., lead 4.2%, zinc 17.3%. This ore was subjected to flotation separation with agitation and aeration with the zinc section mill waters as a separating medium in the presence of an amount of finely ground coke equivalent to 1.7 lbs. per ton of ore treated. A differential float in the first box was obtained assaying silver 53.2 ozs., lead 58.6% and zinc 13.8%.

This process is especially adapted for obtaining leady float concentrates relatively rich in silver.

I claim:—

1. A process for the selective separation of minerals which consist in subjecting to flotation separation, in the presence of a powdered carbonaceous material, an ore containing mixed minerals each normally susceptible to flotation separation, and by the influence of said carbonaceous material differentially modifying said normal flotation susceptibilities of said minerals to form a flotation product relatively high in certain mineral values and a residue relatively high in other mineral values.

2. A process for selective separation of minerals which consists in agitating and aerating an ore pulp containing mixed minerals, while modifying their relative flotation susceptibilty by the presence of powdered carbonaceous material in said pulp to increase the proportion of one mineral in the float and the proportion of another mineral in the residue.

3. A process for selective separation of minerals which consists in agitating and aerating an ore pulp containing mixed minerals, while modifying their relative flotation susceptibility by the presence of powdered coke in said pulp to increase the proportion of one mineral in the float and the proportion of another mineral in the residue.

4. A process for selective separation of minerals which consists in agitating and aerating an ore pulp containing mixed minerals and a small proportion of a mineral-frothing agent, while modifying the relative flotation susceptibility of said mixed minerals by the presence of powdered carbonaceous material in said pulp to increase the proportion of one mineral in the float and the proportion of another mineral in the residue.

5. A process for selective separation of minerals which consists in agitating and aerating an ore pulp containing mixed minerals and a small proportion of a mineral-frothing agent, while modifying the relative flotation susceptibility of said mixed minerals by the presence of powdered coke in said pulp to increase the proportion of one mineral in the float and the proportion of another mineral in the residue.

6. A process for selective separation of minerals which consists in agitating and aerating a non-acid ore pulp containing mixed minerals and a small proportion of a mineral-frothing agent, while modifying the relative flotation susceptibility of said mixed minerals by the presence of powdered carbonaceous material in said pulp to increase the proportion of one mineral in the float and the proportion of another mineral in the residue.

7. A selective ore-separating process which consists in subjecting to flotation separation a comminuted ore containing mixed zinc and lead sulfids, while modifying their relative flotation susceptibility by presence of a powdered carbonaceous material in said ore to increase the proportion of lead sulfid in the float and the proportion of zinc sulfid in the residue.

8. A selective ore-separating process which consists in agitating and aerating an ore pulp containing mixed zinc and lead sulfids, while modifying their relative flotation susceptibility by a modicum of powdered carbonaceous material in said pulp to increase the proportion of lead sulfid in the float and the proportion of zinc sulfid in the residue.

9. A selective ore-separating process which consists in agitating and aerating an ore pulp containing mixed zinc and lead sulfids, while modifying their relative flotation susceptibility by a modicum of powdered coke in said pulp to increase the proportion of lead sulfid in the float and the proportion of zinc sulfid in the residue.

10. A selective ore-separating process which consists in agitating and aerating an ore pulp containing mixed zinc and lead sulfids with a small proportion of a mineral-frothing agent, while modifying the relative flotation susceptibility of said sulfids by a modicum of powdered carbonaceous material in said pulp to increase the proportion of lead sulfid in the float and the proportion of zinc sulfid in the residue.

11. A selective ore-separating process which consists in agitating and aerating a non-acid ore pulp containing mixed zinc and lead sulfids with a small proportion of a mineral-frothing agent, while modifying the relative flotation susceptibility of said sulfids by a modicum of powdered coke in said pulp to increase the proportion of lead sulfid in the float and the proportion of zinc sulfid in the residue.

12. A process for the separation of minerals which consists in subjecting a pulp of an ore containing mixed minerals to agitation and aeration in a non-acid pulp to which is added a small proportion of a mineral-frothing agent and a small quantity of a powdered carbonaceous material whereby a flotation product relatively high in certain values and a residue relatively high in other values are obtained.

13. A process for the separation of a mixed zinc-lead sulfid ore which consists in subjecting such an ore to agitation and aeration in a non-acid pulp to which is added a small proportion of a mineral-frothing agent and a small quantity of powdered coke, whereby a flotation product relatively high in lead sulfid and a residue relatively high in zinc sulfid are obtained.

In testimony whereof I have signed my name to this specification in the presence of two subscribing witnesses.

JAMES HEBBARD.

Witnesses:
IRENE A. HACK,
G. R. CULLEN.